J. WENSTON.
STREET CAR.
APPLICATION FILED SEPT. 20, 1910.

986,252.

Patented Mar. 7, 1911.

4 SHEETS—SHEET 1.

WITNESSES:

INVENTOR

BY

ATTORNEY

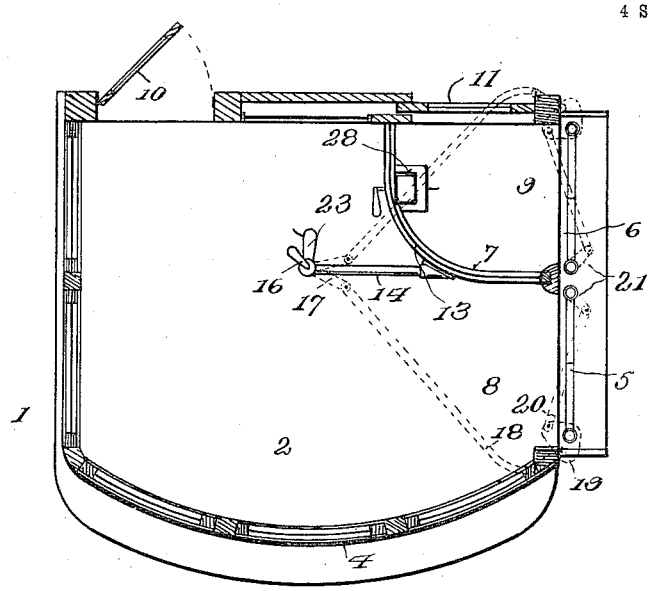
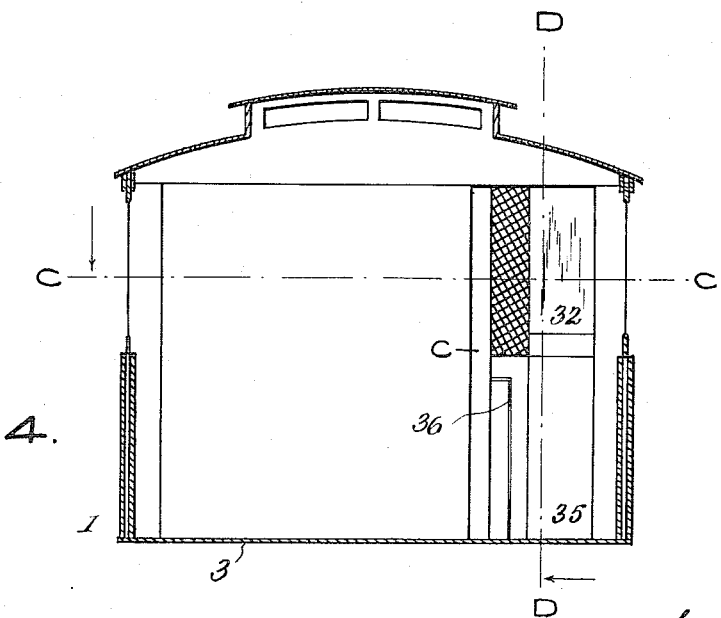

J. WENSTON.
STREET CAR.
APPLICATION FILED SEPT. 20, 1910.
986,252.
Patented Mar. 7, 1911.
4 SHEETS—SHEET 3.
Fig. 5.
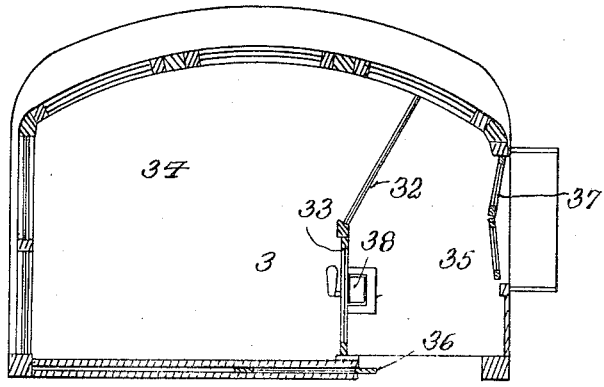
Fig. 7.
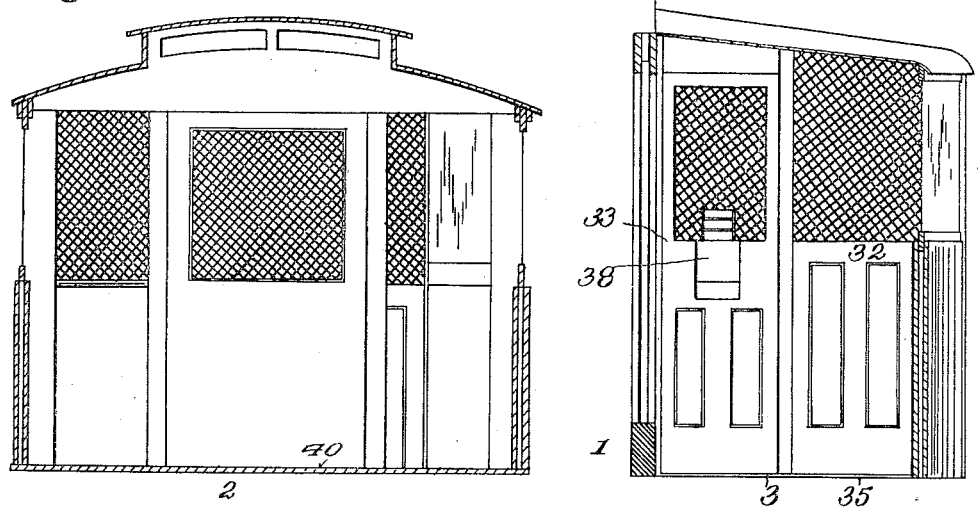
Fig. 6.
Fig. 8.
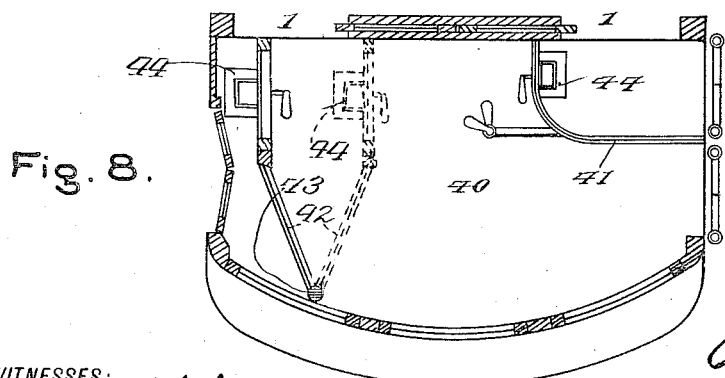
WITNESSES:
John Wenston
INVENTOR
BY
ATTORNEY

J. WENSTON.
STREET CAR.
APPLICATION FILED SEPT. 20, 1910.

986,252.

Patented Mar. 7, 1911.
4 SHEETS—SHEET 4.

WITNESSES:

INVENTOR
BY
ATTORNEY

UNITED STATES PATENT OFFICE.

JOHN WENSTON, OF NEWARK, NEW JERSEY.

STREET-CAR.

986,252.  Specification of Letters Patent.  Patented Mar. 7, 1911.

Application filed September 20, 1910. Serial No. 582,959.

*To all whom it may concern:*

Be it known that I, JOHN WENSTON, a citizen of the United States, residing at Newark, in the county of Essex and State of New Jersey, have invented certain new and useful Improvements in Street-Cars; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in the art, or a system of collecting fares on street cars.

At present, car fare is paid to the conductor after entering the car, or the amount is dropped into a box upon entering. By either system it is possible for a dishonest employee to hold back and convert to his own use considerable sums of money from the amounts taken in by him and escape without detection through the many schemes which his ingenuity may suggest and his boldness carry out.

According to my invention, I propose to provide a new and effective system of collecting fares, by having the conductor upon payment of a fare by the passenger, hand the latter a check, and arrange at the exits of the car boxes, into which the checks are to be deposited when the passenger passes out. As a further safe guard against a passenger riding free, the boxes will be arranged so that the conductor and motorman can observe if the check has been deposited, and if not the doors of the car will not be opened, until the check previously handed to the passenger is deposited. As a further safe guard against fraud, the conductor and motorman will be each inclosed in a screened compartment, so that no connivance in any manner or form will be possible in appropriating the fares.

With these, and other objects, and advantages, to be hereinafter described and claimed, I will proceed to describe my invention.

Figure 1:
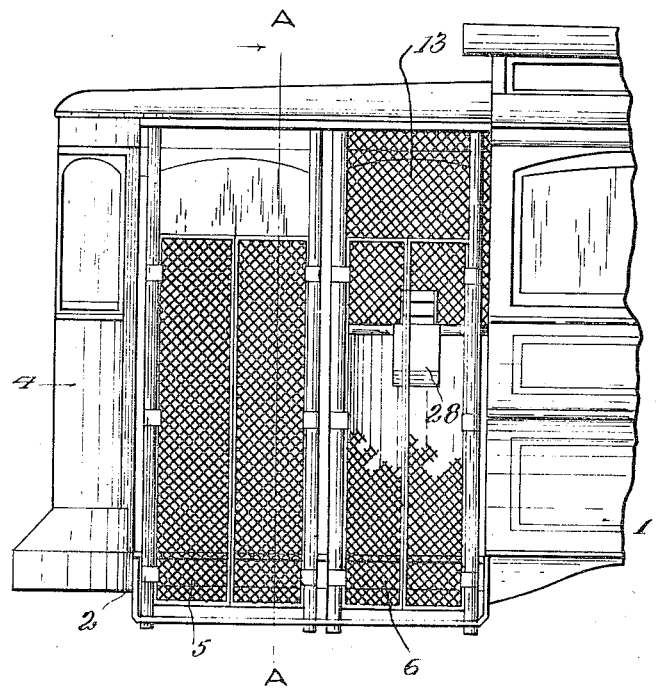
Figure 2:
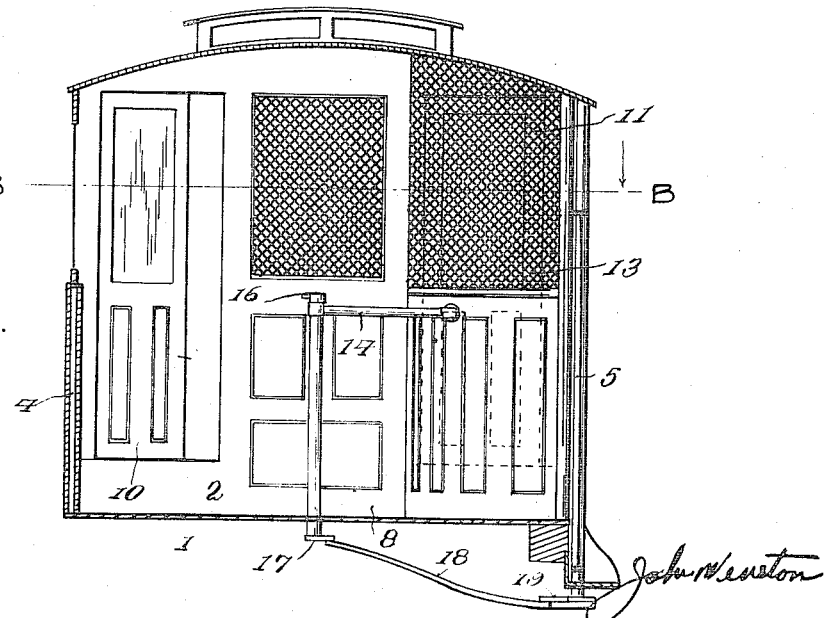
Figure 9:
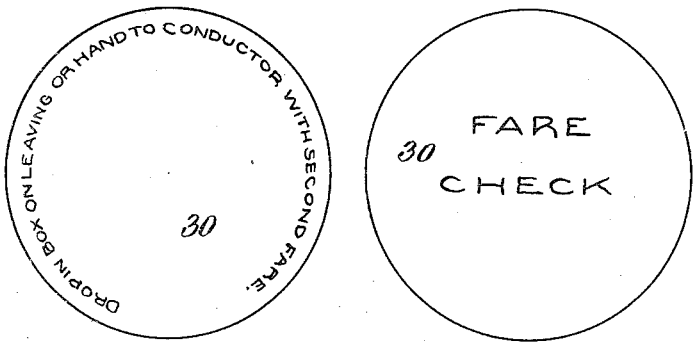
Figure 10:
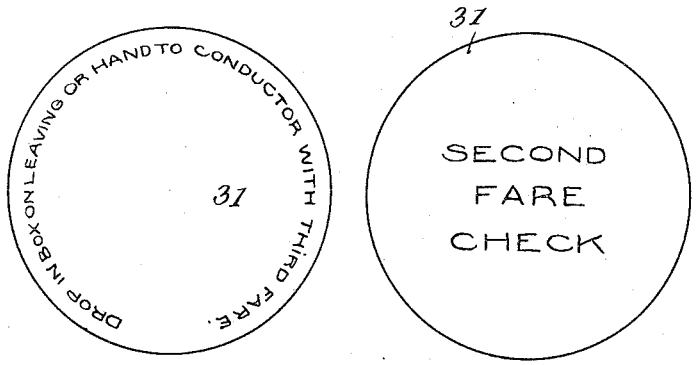

In the drawings: Figure 1 is an elevation of the rear platform of a car. Fig. 2 is a transverse section on the line A—A, Fig. 1. Fig. 3 is a horizontal section on the line B—B, Fig. 2. Fig. 4 is a transverse section of a car, looking toward the front end. Fig. 5 is a horizontal section through the front platform, on the line C—C, Fig. 4. Fig. 6 is a detail vertical section on the line D—D, Fig. 4. Fig. 7 is a transverse section of what is known as a double end car. Fig. 8 is a horizontal section through the platform of the car, shown in Fig. 7. Figs. 9 and 10 are detail views of checks used in carrying out my system.

1 represents a car, of the pay as you enter type, and provided with the usual front and rear platforms 2 and 3. The rear platform 2, is inclosed by an end wall 4, and has inlet and outlet gates 5 and 6. A rail 7, divides the platform into two passageways 8 and 9, a door 10, leading from the inlet passageway 8, and a door 11, leads into the exit passageway 9. Extending from the top to the bottom of the platform adjacent rail 7, is a partition 13 which is in part a screen, and a guard rail 14 extends out from the rail 7. The conductor stands between the screen and the guard rail 14, so that he has no means of conniving with an outgoing passenger.

Mounted on the guard rail 14, is an operating handle 16 having a crank lever 17 at its lower end, connected by a link 18 with a plate 19. The plate 19 is connected to the spindle of the outer gate 5, and it is connected by a link 20, with a crank lever 21, on the corresponding spindle of the other gate 5. By operating the handle 16, the gates 5 may be opened. A second handle 23, is mounted adjacent the guard rail 14, and it is provided with a crank, which is connected with links, etc., to the gates 6, in precisely the same manner as described with reference to the gates 5, so that by operating the handle 23, the gates 6 may be opened or closed.

Located in the exit passageway 9, is a box 28, into which a passenger, upon leaving the car may deposit a check, 30 or 31, as the circumstances may be.

On the front platform 3, is a partition 32, and a door 33, both partition and door having screens to form a compartment 34, for the motorman, and an exit passage 35, for the passengers. A door 36 is located between the car and the passageway 35, and a door 37 is located at the side of the car to permit egress from the platform. In the compartment 35, is located a box 38, into which a passenger deposits a check 30 or 31 as the circumstances may be, this box, like the box 28, being on the outside of the motorman's, or conductor's compartment, to preclude the possibility of either of these attendants conniving with the passenger to withhold fares.

As a passenger enters the rear platform, the conductor receives the fare, and hands him a check 30, of appropriate design. The passenger passes through the door 10 and into the car with his check. When leaving the car, preferably by way of the front door, he deposits the check in the box 28. Now if the passenger fails to drop his check in the respective box when leaving the car, the motorman or conductor will close the respective exit doors and prevent the passenger leaving until he drops the check in the box. It is at this period in my system, or art, of collecting fares, that the screens, or partitions 13 and 32 come into use, for if it were not for this arrangement the conductor or motorman might possibly connive with the passenger and exchange the check for a fare, and therefore defeat the purpose of the invention, so that every fare is accurately accounted for. For if a passenger should, upon entering the car, fail to pay the conductor, it would be detected upon leaving the car. Under these circumstances it would be necessary for the passenger to go back into the car and pay his fare to the conductor, obtain a check, and then pass out in the prescribed way, and drop the check in the box.

In case it becomes necessary, as often happens on long runs for the second fare to be collected, the conductor leaves the rear doors open so the passengers might enter while he is busy, then he leaves his place on the platform and goes into the car and collects a second fare from the passengers and gives them each a second fare check and receives back the first check which he had before given, and so on in the case of third fare check, and he collects a first fare from the passengers who have just entered and gives them the first fare check. In no case shall the passenger retain the first fare check when given the second fare check. Transfers are accepted the same as money and for them are issued fare checks also. The conductor holds all money collected until the end of his run.

At the end of the run the conductor turns in his checks which he carries in a change carrier of the same pattern as the present ones in use. The money and transfers which he turns in should represent the value of the checks which he has given out and which should appear in the boxes; but they also may be ascertained by finding the difference between the checks turned in and the number taken out at the beginning of the run, an account of which should be kept. This does away with the necessity of ringing up fares and supplying the conductors with change, as done at present, and the system may be used upon any make of car, whether closed, combination, or open, since it makes no real difference whether the passenger deposits his check or not in the box as an account can be kept of the amount taken in by ascertaining the difference between the number of checks taken out by the conductor and those returned by him.

In Fig. 8, each platform 40, is provided with two partitions 41 and 42, which extend from the top to the bottom of the car. The partition 42 is hinged at 43 so that it may be folded over against the side of the car to provide a passageway for the entrance of the passenger at the rear of the car. The partition 41 is for the purpose of providing an exit passageway from the car when the partition 42 is folded against the side of the car. When the partition 42 is in the position shown in Fig. 8 it provides a passageway at the front of the car and a compartment for the motorman. The construction of both end platforms are precisely the same, and as it provides a means for a pay-as-you-enter car without turning the car around as would be the case with the construction shown in the previous figures, it is obvious that means must be provided whereby the partition 42 may be moved to accommodate the platform, shown in Fig. 8 for a rear instead of a front platform. A fare box 44 is shown in the compartment adjacent the partition 41, and a handle extends therefrom to the opposite side of said partition to operate the fare box. This fare box is used only when the partition 42 on the platform shown in Fig. 8, is moved to one side and a passenger desires to come from the car from the rear. A similar fare box 44 is secured to the partition 42 and it has a handle extending beyond the partition to operate said fare box. This fare box is only used when the partition 42 is positioned as shown in Fig. 8, which is the front of the car, and is designed to receive the fare checks as the passenger leaves the car in precisely the same manner as described in connection with Fig. 5.

Having thus described my invention, what I claim is:

1. In a car, the combination of a body provided with front and rear platforms, partitions intermediate each platform and the body, an inlet and outlet door in the partition separating the rear platform from the body, a partition on the rear platform extending from the top to the bottom of the car to form an inlet passageway leading to the inlet door and an outlet passageway leading from the outlet door, a fare box in the outlet passageway on the rear platform, a handle located in the inlet passageway on the rear platform for operating said fare box, a partition on the front platform to provide an outlet passageway and a separate motorman's compartment, said partition extending from the top to the bottom of the car, the partition separating the body of the car from the front platform having an outlet door communicating with the outlet passageway on the front platform, a fare box located in the outlet passageway on the front platform, and a handle on the fare box extending into the motorman's compartment for operating the latter fare box.

2. In a car, the combination of a body provided with front and rear platforms, partitions intermediate each platform and the body, an inlet and outlet door in the partition separating the rear platform from the body, a partition on the rear platform extending from the top to the bottom of the car to form an inlet passageway leading to the inlet door and an outlet passageway leading from the outlet door, a fare box in the outlet passageway on the rear platform, a handle located in the inlet passageway on the rear platform for operating said fare box, a partition on the front platform to provide an outlet passageway and a separate motorman's compartment, said partition extending from the top to the bottom of the car, the partition separating the body of the car from the front platform having an outlet door communicating with the outlet passageway on the front platform, a fare box located in the outlet passageway on the front platform, a handle on the fare box, and extending into the motorman's compartment for operating the latter fare box, gates for closing the inlet and outlet passageways on the rear platform, and means located in the inlet passageway for independently operating each gate.

3. In a car, the combination of a body provided with front and rear platforms, partitions intermediate each platform and the body, an inlet and outlet door in the partition separating the rear platform from the body, a partition on the rear platform extending from the top to the bottom of the car to form an inlet passageway leading to the inlet door and an outlet passageway leading from the outlet door, said partition being in part formed of an open screen, a fare box in the outlet passageway on the rear platform, a handle located in the inlet passageway on the rear platform for operating the fare box, a partition on the front platform to provide an outlet passageway and a separate motorman's compartment, said partition extending from the top to the bottom of the car and being formed in part of an open screen, the partition separating the body of the car from the front platform having an outlet door communicating with the outlet passageway on the front platform, a fare box located in the outlet passageway on the front platform, and a handle on the fare box extending into the motorman's compartment for operating the latter fare box.

4. A car comprising a body and front and rear platforms, the rear platform having a partition extending from the top to the bottom of the car to provide inlet and outlet passageways, a fare box in the outlet passageway, a handle extending from the fare box into the inlet passageway to operate said fare box, a gate for controlling the entrance of the inlet passageway, a handle in the inlet passageway for opening and closing the gate, a gate for the outlet passageway, a handle located in the inlet passageway for opening and closing the latter gate, a partition on the front platform extending from the top to the bottom of the car to provide an exit passageway and a motorman's compartment, a fare box in the exit passageway, a handle extending from the fare box and located in the motorman's compartment for operating the latter fare box, and a gate for controlling the exit passageway.

In testimony whereof I have signed my name to this specification in the presence of two subscribing witnesses.

JOHN WENSTON.

Witnesses:
 EDWIN J. C. JOERG,
 HENRY R. DOLAN.